United States Patent [19]

Handtmann

[11] 4,384,479

[45] May 24, 1983

[54] AUTOMOTIVE VEHICLE FUEL CONSUMPTION MEASURING DEVICE

[75] Inventor: Dieter Handtmann, Sindelfingen, Fed. Rep. of Germany

[73] Assignee: Robert Bosch GmbH, Stuttgart, Fed. Rep. of Germany

[21] Appl. No.: 243,194

[22] Filed: Mar. 12, 1981

[30] Foreign Application Priority Data

Mar. 25, 1980 [DE] Fed. Rep. of Germany ....... 3011411

[51] Int. Cl.³ .............................................. G01F 9/00
[52] U.S. Cl. ...................................... 73/114; 73/115
[58] Field of Search .................................. 73/114, 115

[56] References Cited

U.S. PATENT DOCUMENTS 3,977,238  8/1976  Byington, Jr. .................... 73/115 X
4,282,746  8/1981  Henke et al. ......................... 73/114

Primary Examiner—Jerry W. Myracle

Attorney, Agent, or Firm—Frishauf, Holtz, Goodman & Woodward

[57] ABSTRACT

To provide for direct indication of fuel consumption rate (miles per gallon; kilometers per liter; liter/100 km) of fuel, a manometer providing output indication of induction pipe pressure has additional scales which read, directly, in fuel consumption, the respective scales being associated with fuel consumption at a selected gear in which the vehicle is then operating. Gear range information can be obtained from a switch coupled to the gear selection lever, from comparing vehicle wheel or transmission output speed with engine speed, derived, for example, from an ignition signal; to determine fuel consumption rate under pushing or towing operation, with the throttle closed, the vehicle tachometer can have an additional scale thereon showing fuel consumption rate with throttle closed. The fuel consumption rate scale of the manometer or the tachometer, respectively, can be selectively illuminated under control of the transmission output signal.

19 Claims, 3 Drawing Figures

AUTOMOTIVE VEHICLE FUEL CONSUMPTION MEASURING DEVICE

The present invention relates to a measuring device and arrangement to determine the fuel consumption of automotive-type internal combustion engines installed in automotive vehicles during operation of the vehicle.

Background

For most efficient utilization of available fuel, it is desirable to provide the operator of an automotive vehicle with a continuous indication of his actual fuel consumption. This permits the operator to so arrange his mode of control of the vehicle that the vehicle is operated with maximum fuel efficiency, that is, utilizing the least amount of fuel under then existing operating conditions. It is, therefore, desirable to provide an indicator which provides for the operator an output indication which is clearly legible and relates the existing operating conditions of the vehicle and of the engine thereof to fuel consumption. Pressure in the induction pipe or the inlet manifold of an internal combustion engine is an indication of fuel use, and induction pipe pressure indicators have previously been proposed. Fuel use, however, is not only governed by the pressure in the induction pipe, but additionally by speed and operating conditions of the vehicle which are determined by components different from the engine itself.

The Invention

It is an object to provide a fuel indicator from which the operator of a vehicle will be able to directly read fuel consumption rate at then pertaining operating conditions.

Briefly, a manometer, that is, a pressure sensing apparatus, is connected to the induction pipe or intake manifold of the internal combustion engine which is coupled to an indicator, for example an indicator scale, which has various scale ranges specific for the particular gear or gear range in which the vehicle then operates and which has as the scale indication a direct reading scale in fuel consumption, for example in miles per gallon, kilometers per liter, or the inverse, in liters per 100 kilometers.

DRAWINGS

Figure 1:
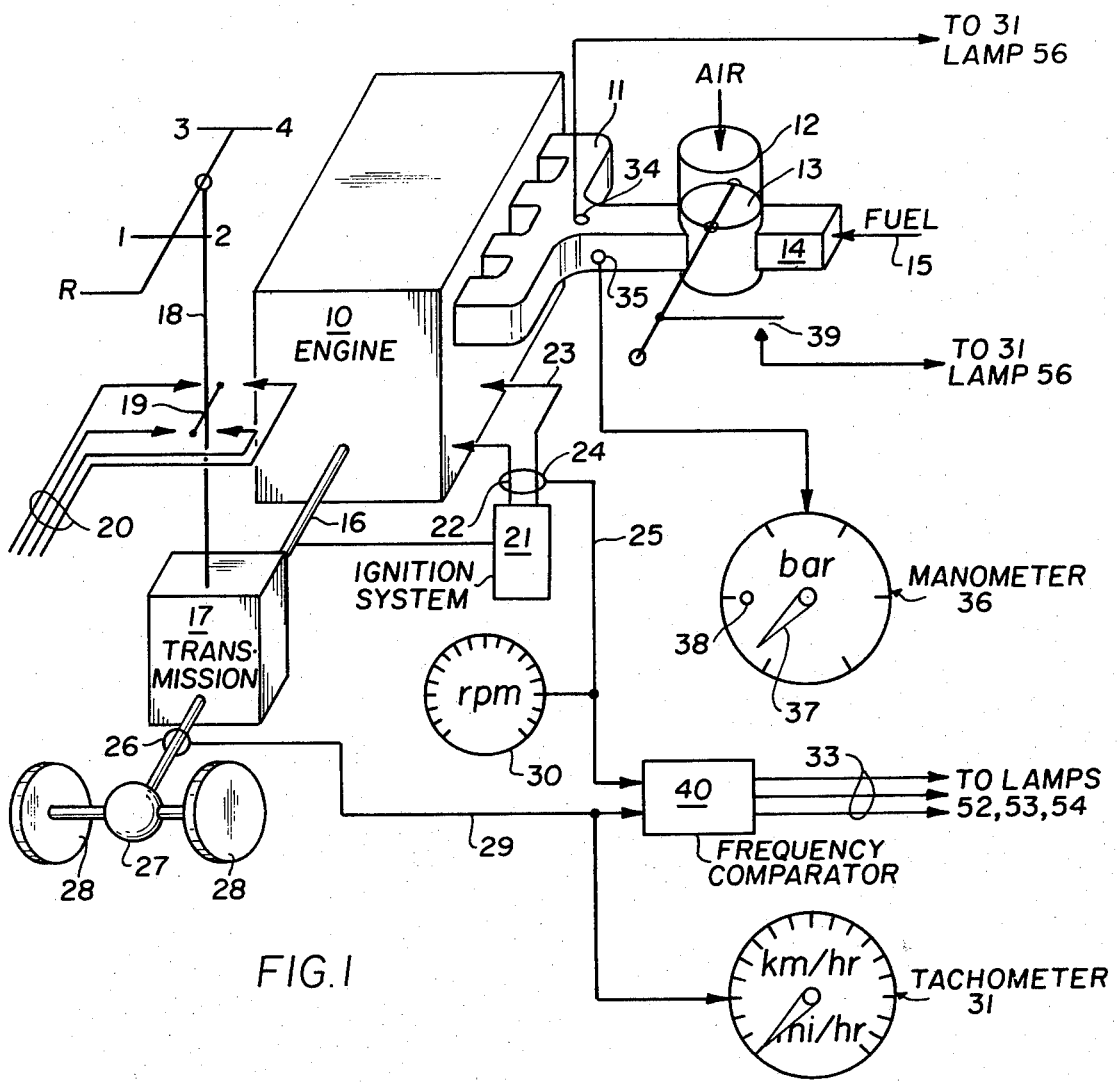
FIG. 1 is a highly schematic view of an engine and drive train system with indicators and signal generating elements in accordance with the present invention.

Continuous fuel consumption, with respect to time, can be defined by the following equation:

$$q_B \sim P_s \cdot n_M \quad (1),$$

wherein $q_B$ is fuel consumption with respect to time; $P_s$ pressure in the intake manifold or induction pipe (not vacuum!) $n_M$ engine speed.

The foregoing approximate equality, equation (1), is based on two essential approximations:

(I) The air-fuel ratio is effectively constant throughout all operating conditions of the engine; and (II) the extent of fuel supply to the respective cylinder is uniform; in other words, the extent of fuel supply or quantity of fuel in any one of the respective cylinders is proportional to the absolute pressure $P_s$ in the induction pipe or inlet manifold of the engine.

If the two above approximations are not met, then errors in indication will obtain; these errors compensate, however, essentially with respect to indication of fuel use over the usual and relevant operating conditions under which the engine functions.

The indicated value of interest to the operator or driver is the rate of use of fuel, B/s, with respect to a predetermined distance s:

$$\frac{B}{s} = \frac{q_B}{v} \quad (2)$$

or the inverse thereof $$\frac{s}{B} = \frac{v}{q_B} \quad (2a)$$

in which B is the actual use of fuel L which occurred during the distance s; and v is vehicle speed.

$$v \sim n_R \quad (3)$$

in which $n_R$ is the speed, in rpm, of the drive wheels.

Relating equations (1), (2) and (3), provides:

$$\frac{B}{s} \sim P_s \cdot \frac{n_M}{n_R} \sim P_s \cdot u \quad (4)$$

in which u represents the transmission ratio of the speed gear in which the vehicle operates. In a vehicle with a four-speed transmission, four fixed values are represented thereby. Reverse and neutral, of course, need not be counted. The fuel consumption in reverse is not of interest, usually, to the driver, and in neutral, of course, u=0.

The relationship (4) above can be modified by a further multiplication factor k which is a constant, specific to the particular engine in question.

The system also can provide an indication of fuel consumption when the vehicle is being driven by the wheels themselves, for example under downhill operation, with the throttle closed. This type of operation—wheels driving the engine with closed throttle—may be defined as "towing operation". Fuel consumption under towing operation can be indicated by a consumption indication scale on the tachometer of the vehicle, since the consumption will be proportional to engine speed. This scale can provide direct read-out in miles per gallon, kilometers per liter, or the inverse, liters per 100 kilometers. Reading of the respective fuel consumption can be facilitated, in accordance with a feature of the invention, by optically highlighting the respective scale. This optical highlighting can be obtained by optical indication, for example by brightly illuminating the scale associated with towing operation, or otherwise optically specifically indicating the scale. Signals for brightly indicating the specific scale region can be derived by contacts on the gear selection lever of the vehicle or from the transmission thereof. In addition to the vehicle gear, a fuel consumption scale can be provided on the tachometer with brightness indication in which the brightness indication is enabled by a switch coupled to the throttle. It is also possible, in accordance with a feature of the invention, to provide brightness indication of the consumption scale on the tachometer by a pressure switch in the induction pipe or the inlet manifold; the switching point of such a pressure switch may, for example, be at approximately 0.25 bar. A particularly simple arrangement is obtained if the brightness indication of the consumption scale on the tachometer is effected by a contact located in or on the manometer or pressure indicator coupled to the inlet manifold or induction pipe.

Referring to the drawings: FIG. 1 is a highly schematic view of an automotive drive train. An engine 10 has an intake manifold 11 which is connected to an induction pipe 12 which includes a throttle plate 13. A carburetor 14 is coupled to the induction pipe to provide fuel thereto. Air is supplied to the intake or induction pipe 12, as is customary, through an air filter (not shown). Fuel is supplied to the carburetor 14 through a fuel line, as schematically indicated by arrow 15.

The engine shaft 16 is coupled to a transmission 7 which has a transmission control lever 18 movable, as is customary, in the normal "H" pattern to engage gears 1, 2, 3, 4 and reverse, R. The gear selection lever 18 has a switch bar 19 thereon which, upon movement of the gear selection lever between the respective positions 1, 2, 3, 4, operates respective switches which are connected to switch control lines which are selectively energized and carried out from the transmission control arrangement in a cable 20.

The speed of the engine can be sensed in various ways; in a simple manner, the engine shaft 16 is coupled, for example mechanically or electrically, to an ignition system 21 providing ignition pulses on ignition cables 22, 23 to suitable spark plugs. Pulses occurring upon generating ignition pulses are picked off one or more of the ignition cables by a pick-up 24 which, for example, may be inductive or capacitative, so that pulses representative of engine speed are available on cable 25. The output speed of the transmission 17 is sensed by speed sensor 26. The output shaft from the transmission is connected through the usual differential 27 to wheels 28. Wheel speed signals are available on a signal line 29. The engine speed can be indicated on a revolution indicator 30, reading in rpm. Vehicle speed is indicated on the tachometer 31, for example in km/h or miles per hour.

Pressure in the inlet manifold is sensed by a pressure sensor 35, for indication on a manometer 36. A fragment of the scale of the manometer 36 is shown to an enlarged scale in FIG. 2. The manometer 36 has a pointer 37 which is arranged to cooperate with a contact 38 on the manometer, set for example at 0.25 bar. When the manometer passes the 0.25 bar position, a circuit is enabled to illuminate a scale on the tachometer 31. Alternatively, a switch 39 coupled to the throttle plate 13 and enabled when the throttle is completely closed can be used to control a respective indication on the tachometer. Such switches on the throttle are frequently present, for example to control other operations. A vacuum switch 34, and also usually present in many automotive engine installations, can also be used to illuminate a scale on the tachometer 31. This switch, for example, can also be set to be energized at the level of 0.25 bar. Thus, existing equipment can be used to provide a fuel consumption indication, reading directly in kilometers per liter, or miles per gallon, or liters per 100 km.

Figure 2:
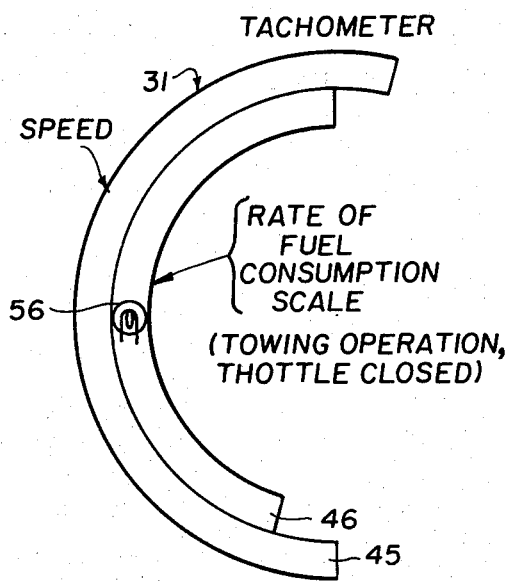
FIG. 2 is a fragmentary schematic top view of a tachometer indicator with a fuel consumption scale.
Figure 3:
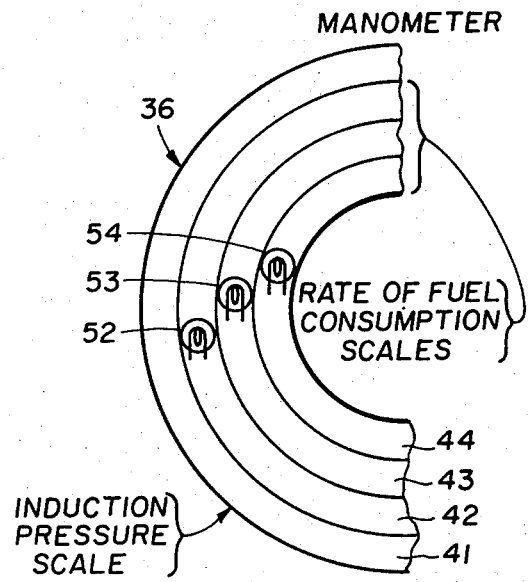
FIG. 3 is a fragmentary top view of a manometer indicator with multiple scales.

The information to be applied to the respective indicator scales, the enlarged views of which are shown in FIGS. 2 and 3, representative of which one of the transmission gears are engaged, can be derived not only from the switch 19, connected to cable 20, but also in different form. Already existing equipment can be utilized, for example by connecting the engine speed cable 25 and the tachometer connection 29, carrying the wheel speed signal to a frequency discriminator or frequency comparator 40. The output from the frequency comparator 40 then can be a signal available on a cable 33 which, in dependence on energization of a respective wire of the multi-wire cable 33, indicates which one of the gears is engaged. If the input and output speeds to the transmission are the same—comparison = 1.0—then "direct" gear is engaged; upon respectively predetermined differences in the frequency of the signals on line 25 and 29, respectively different individual lines of the cable 33 can be energized. Only three output cables are shown for simplicity, although, of course, as many output cables can be provided as there are transmission gear ranges. Of course, a single line, also, can be used with suitably coded signals, in analog or digital form, providing outputs representative of the respective frequency ratios on lines 25, 29, and hence of the gear engaged.

The tachometer scale, FIG. 2, carries an outer scale 45 providing speed indications and reading, for example, in km/h or miles per hour. This is standard. In accordance with a feature of the present invention, the tachometer scale carries an additional scale. Scale 46 is, selectively, illuminated or selectively highlighted, as indicated, schematically, by individual lamp 56. Energization of the lamp 56, then, is enabled only if a signal is derived from either one of switch 38 on the manometer, switch 39 on the throttle, or switch 34 on the induction pipe, indicating that the throttle is closed.

The pointer of the tachometer 31, of course, will move in accordance with vehicle speed. By suitable arrangement of the indicia of the indicating scale 46, the fuel consumption at the respective speed can be readily read off the tachometer scale.

FIG. 3 illustrates, highly schematically, a manometer scale of the manometer 36. The outer scale 41 can read, for example, in pressure, i.e. bar. The inner scales 42, 43, 44 will read in fuel consumption, for example miles per gallon, kilometers per liter, or the inverse, liters per 100 km. The respective scales 42, 43 44 are associated with the respective gear ranges, that is, first, second, third and fourth gear. Only three gear ranges are shown in FIG. 3 for simplicity of the drawing. The scales can be uniformly illuminated, in which the driver has to associate, mentally, the respective gear in which the vehicle is then operating with the respective fuel consumption indication; or, preferably, although at higher cost, the individual scales 42, 43, 44 can be illuminated by respective individual lamps 52, 53, 54 and, again, energized in accordance with the respective energization of the wire in cable 20 or cable 33, respectively. The indicia on the respective scales 42, 43, 44 need not be exactly comparable to the gear ratios but can be so arranged that they individually reflect the fuel consumption with the respective gear which is engaged.

Vehicles using manual transmissions can use switches coupled to the manual transmission selected lever 18, for example a switch similar to that schematically shown at 19. Vehicles with automatic transmissions, where the driver may not have control over the specific transmission range engaged, or no immediate knowledge of the transmission range, preferably use an automatic indication of the difference in speed between the engine output shaft and wheel speed as determined, for example, by frequency comparator 40, comparing engine speed in the form of sequential pulses, that is, of pulses having a given frequency representative of engine speed on line 25, with pulses or signals having a frequency representative of actual wheel speed on line 29. Various types of automotive vehicles have existing equipment in which signals on individual lines of cable 20 and on lines 25, 29 can be derived. Thus, the system provides for versatility since the particular signal which is most readily sensed can be utilized to provide, in combination with a suitable scale, a direct reading of fuel consumption at any existing operating condition of the vehicle.

Various changes and modifications may be made within the scope of the inventive concept.

I claim:

1. Automotive vehicle engine fuel consumption measuring device, in which the vehicle has a multi-gear range transmission (17) comprising, in accordance with the invention, the combination of
    a pressure sensing means (35) sensing pressure in the induction pipe of the engine and providing an engine pressure signal;
    an indicator (36) having a plurality of scales (42, 43, 44) which provide fuel consumption indications, each scale being specific to a specific gear range of the vehicle transmission, said indicator responding to the pressure signal so that the indication output of the pressure sensing means will indicate, directly, fuel consumption per unit distance (miles per gallon; kilometers per liter; liters per 100 km) in which the vehicle then operates; and
    optical means (52, 53, 54) coupled to the vehicle transmission (17) and optically indicating the respective one of the scale which is associated with, and representative of, fuel consumption of the vehicle engine at the then engaged gear range.

2. Device according to claim 1, wherein said optical indication means comprises illumination means (52, 53, 54) providing for brightness illumination of the specific selected scale associated with the respective gear range.

3. Device according to claim 1, including transmission gear sensing means (19, 40) sensing the gear range in which the vehicle then operates and providing a transmission gear range output signal.

4. Device according to claim 1, including transmission gear sensing means (19, 40) sensing the gear range in which the vehicle then operates and providing a transmission gear range output signal;
    and wherein said transmission gear range output signal controls the optical indicating means to optically associate the respective selected scale with the transmission gear range in which the vehicle then operates.

5. Device according to claim 4, wherein said transmission has a manual transmission control lever (18);
    and a switch (19) is provided, coupled to said control lever and selectively engaging switching contacts representative of a selected gear range in accordance with a predetermined position of said control lever.

6. Device according to claim 4, further including means (21, 22, 24, 25) sensing engine speed and providing an engine speed signal;
    means (26, 29) sensing transmission output speed and providing a vehicle speed signal;
    and comparator means (40) having said engine speed signal and said vehicle speed signal applied thereto and providing an output signal representative of the difference between the vehicle speed signal and the engine speed signal to furnish a signal indicative of the transmission gear range in which the transmission then operates.

7. Device according to claim 6, wherein said engine speed signal is a signal having a frequency representative of engine speed; said vehicle speed signal is a signal having a frequency representative of vehicle speed;
    and said comparison means comprises a frequency comparator, comparing the frequency of said vehicle speed signal and said engine speed signal and providing, respectively, output signals representative of predetermined differences.

8. Device according to claim 1, wherein said vehicle has a tachometer or vehicle speed indicator;
    and said tachometer includes a plurality of scales (45, 46) providing output indications directly of speed and of fuel consumption rate, respectively, the fuel consumption rate scale indicating fuel consumption per distance (miles per gallon; kilometers per liter; liter/100 km) upon operation with closed engine throttle.

9. Device according to claim 8, further including optical means (56) associated with the fuel consumption rate scale (46) providing output indication of fuel consumption rate on said tachometer and, respectively, energizable in accordance with vehicle operation.

10. Device according to claim 9, further including switch means (34, 38, 39) representative of vehicle operation under closed-throttle conditions, said switch means being coupled to said optical indication means to control the optical indication means if, and only if, the throttle is closed.

11. Device according to claim 10, wherein said vehicle has an induction pipe pressure indicating manometer;
    and said switch means includes a contact button (38) positioned at a predetermined pressure position of said manometer.

12. Device according to claim 10, wherein said switch means includes a vacuum switch (34) coupled to the induction pipe or intake manifold of the engine, and providing a switching output when a predetermined pressure is reached.

13. Automotive vehicle engine fuel consumption measuring device, in which the vehicle has a multi-gear range transmission (17) comprising, in accordance with the invention, the combination of
    a pressure sensing means (35) sensing pressure in the induction pipe of the engine and providing an engine pressure signal;
    an indicator (36) having a plurality of scales (42, 43, 44) which provide fuel consumption indications, each scale being specific to a specific gear range of the vehicle transmission, said indicator responding to the pressure signal so that the indication output of the pressure sensing means will indicate, directly, fuel consumption per unit distance (miles per gallon; kilometers per liter; liters per 100 km) in which the vehicle then operates; and
    transmission gear sensing means (19, 40) sensing the gear range in which the vehicle then operates and providing a transmission gear range output signal.

14. The device according to claim 13 wherein said transmission gear range output signal controls an optical indicating means to optically associate the respective selected scale with the transmission gear range in which the vehicle then operates.

15. Device according to claim 14, further including means (21, 22, 24, 25) sensing engine speed and providing an engine speed signal;
means (26, 29) sensing transmission output speed and providing a vehicle speed signal;
and comparator means (40) having said engine speed signal and said vehicle speed signal applied thereto and providing an output signal representative of the difference between the vehicle speed signal and the engine speed signal to furnish a signal indicative of the transmission gear range in which the transmission then operates.

16. Automotive vehicle engine fuel consumption measuring device, in which the vehicle has a multi-gear range transmission (17) comprising, in accordance with the invention, the combination of
a pressure sensing means (35) sensing pressure in the induction pipe of the engine and providing an engine pressure signal;
an indicator (36) having a plurality of scales (42, 43, 44) which provide fuel consumption indications, each scale being specific to a specific gear range of the vehicle transmission, said indicator responding to the pressure signal so that the indication output of the pressure sensing means will indicate, directly, fuel consumption per unit distance (miles per gallon; kilometers per liter; liters per 100 km) in which the vehicle then operates; and
wherein said vehicle has a tachometer or vehicle speed indicator;
said tachometer includes a plurality of scales (45, 46) providing output indications directly of speed (45) and of fuel consumption rate (46), respectively, the fuel consumption rate scale indicating fuel consumption per distance (miles per gallon; kilometers per liter; liter/100 km) upon operation with closed engine throttle;
and optical means (56) are provided, associated with the fuel consumption rate scale (46) providing output indication of fuel consumption rate on said tachometer and, respectively energizable in accordance with vehicle operation.

17. Device according to claim 16, further including switch means (34, 38, 39) representative of vehicle operation under closed-throttle conditions, said switch means being coupled to said optical indication means to control the optical indication means if, and only if, the throttle is closed.

18. Device according to claim 17, including means (34, 38) sensing induction-type pressure, or vacuum, said switch means being responsive to said induction-type pressure or vacuum sensing means and providing a switching output when a predetermined pressure if reached.

19. Device according to claim 18, wherein said predetermined pressure is in the order of 0.25 bar.

* * * * *